United States Patent [19]  [11] 4,410,000
Mattmann et al.  [45] Oct. 18, 1983

[54] PRESSURE CONTROL APPARATUS FOR AT LEAST TWO PRESSURE VESSELS

[75] Inventors: Beat Mattmann, Lucerne; Marco Dreyer, St. Niklausen; Wilhelm Marti, Horw, all of Switzerland

[73] Assignee: BOA A.G. Luzern, Lucerne, Switzerland

[21] Appl. No.: 258,723

[22] Filed: Apr. 29, 1981

[30] Foreign Application Priority Data

Apr. 3, 1980 [CH] Switzerland ................ 3361/80

[51] Int. Cl.³ ............................................... G05D 11/00
[52] U.S. Cl. ................................. 137/116; 137/118; 137/225; 152/415
[58] Field of Search ........... 137/118, 224, 225, 116.3, 137/116; 152/415

[56] References Cited

U.S. PATENT DOCUMENTS

| | | | |
|---|---|---|---|
| 1,134,701 | 4/1915 | Seeberger | 137/224 |
| 1,513,740 | 11/1924 | Brown | 137/225 |
| 1,736,191 | 11/1929 | Dundin et al. | 152/415 |
| 2,056,064 | 9/1936 | Fenton | 137/225 |
| 2,059,045 | 10/1936 | Seymour | 137/225 |
| 2,789,617 | 4/1957 | Cardi | 152/415 |
| 3,760,859 | 9/1973 | Shahan et al. | 152/415 |
| 4,203,467 | 5/1980 | Cardi | 152/415 |

FOREIGN PATENT DOCUMENTS 570281 10/1975 Switzerland .

Primary Examiner—Martin P. Schwadron
Assistant Examiner—J. R. Shay
Attorney, Agent, or Firm—Anthony A. O'Brien

[57] ABSTRACT

Every pressure vessel is connected by the agency of a connection channel to a control chamber. In both connection channels a shut-off valve is provided. The control chamber comprises a spring bellows whereby a spring counteracts a pressure force acting onto the mean area of said spring bellows. A ring is arranged on a control rod which controls the position of said shut-off valves. Upon a pressure loss in one of the pressure vessels the control rod operates the shut-off valves into their shut-off position such that upon a later pressure rise in one of the pressure vessels these shut-off valves remain closed. This ensures that upon a later pressure rise in an undamaged of the two pressure vessels such will remain separated from the damaged one. This pressure control means is preferably used in a motor vehicle having twin tires such as a truck or bus.

8 Claims, 6 Drawing Figures

PRESSURE CONTROL APPARATUS FOR AT LEAST TWO PRESSURE VESSELS

BACKGROUND OF THE INVENTION

1. Field of the Invention

The present invention relates to an improved pressure control apparatus with a display means for at least two pressure-wise interconnected pressure vessels and comprising a control chamber having a spring biassed piston member, which control chamber is connected to a fluid feed line provided with a check valve means and is further connected to connection channels intended for connection to said pressure vessels.

2. Description of the Prior Art

The Switzerland Patent Specification No. 570 281 discloses an apparatus for controlling the pressure in one or several motor vehicle tires having the same pressure. The tires, i.e. their inner pressure-air filled spaces are connected by means of channels to a pressure chamber of a control apparatus provided with a valve member. Thereby one of the channels extends directly into the pressure chamber and a further channel extends to the valve seat. The main feature of this known apparatus is that if the tire of the motor vehicle which is connected to the channel extending to the valve seat of the apparatus suffers a damage with a resulting pressure loss, the other tire suffers also a pressure loss and looses pressure until it reaches a value which equals the closing pressure of the valve.

This entails, however, such drawback that in case the defective or damaged tire experiences a pressure rise for instance due to wobbling or rubbing or due to an exposure to the sun, such pressure rise may cause a renewed opening of the valve member causing a further amount of air to flow from the intact tire into the damaged tire until the valve member closes once more. Such an arrangement causes obviously a further pressure loss of the sound tire which may lead to undue operating conditions of the intact tire and finally also to a damaging thereof.

SUMMARY OF THE INVENTION

Hence, it is a general object of the present invention to provide an improved pressure control apparatus which ensures that after a separation of the pressure vessels from the control chamber a renewed pressure-wise connection of the pressure vessels to the control chamber is prevented also in such case if one of the pressure vessels experiences again a pressure increase even to a value above its normal operating pressure.

Now, in order to implement these and still further objects of the invention which will become more readily apparent as the description proceeds, the improved pressure control apparatus of this development is manifested by the features of a shut-off valve means, each arranged in every connection channel whereby the operational position of said shut-off valve means is controlled by said spring biassed piston member; that said shut-off valve means are arranged such that in their open position said connection channels are in a pressure communication with said control chamber, and that the spring bias force acting onto said piston member is selected such that said shut-off valve means shuts at a predetermined pressure above ambient pressure.

BRIEF DESCRIPTION OF THE DRAWINGS

The invention will be better understood and objects other than those set forth above will become apparent when consideration is given to the following detailed description thereof. Such description makes reference to the annexed drawings, wherein.

DETAILED DESCRIPTION OF THE PREFERRED EMBODIMENT

Figure 1:
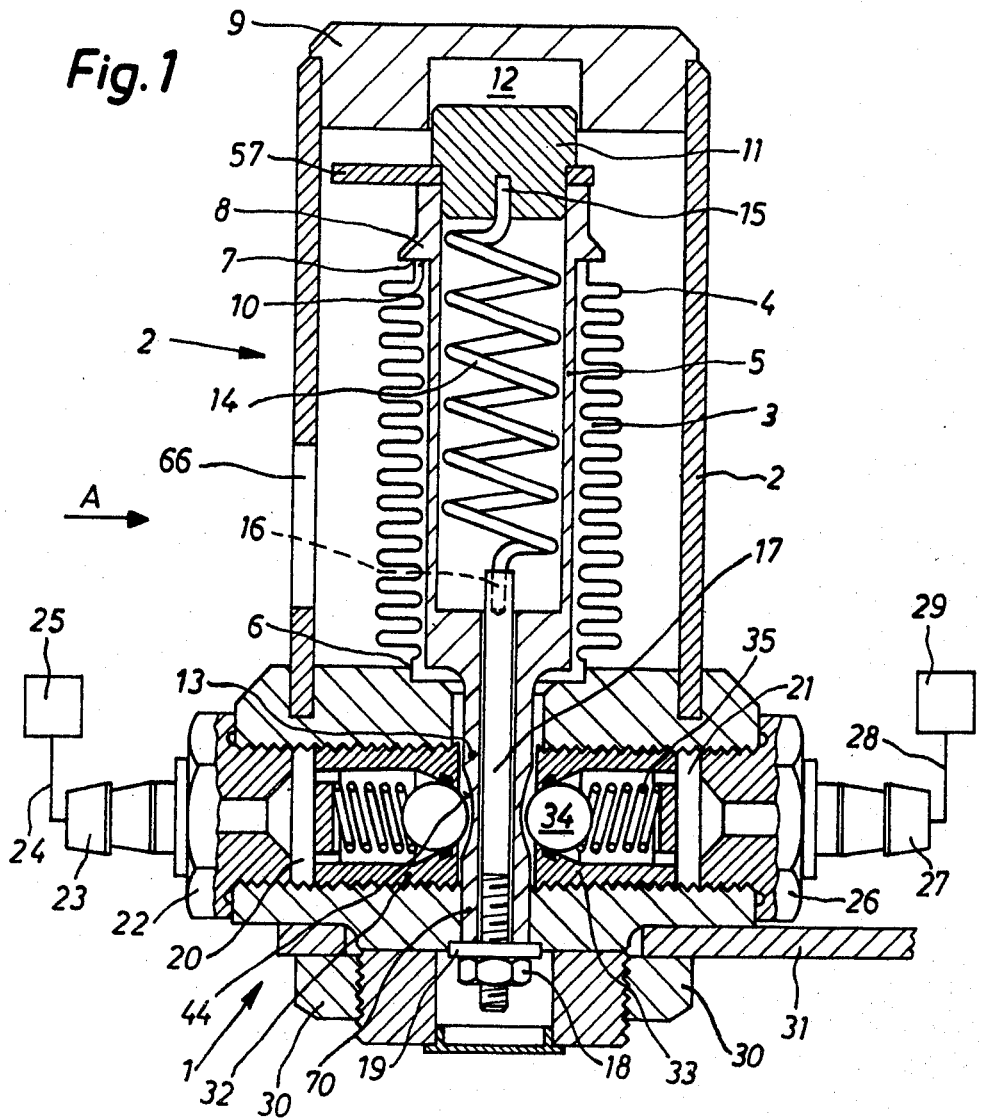
FIG. 1 is a view of a vertical section through a pressure control apparatus.

The preferred embodiment as described is for an application at the double or twin tires of a motor vehicle, such as a truck or bus. This pressure control apparatus is, however, usable as well for other applications at pressure vessels, such as for instance in a chemical process plant. Although in the following description the pressurized fluid is air, thus gaseous, it is to be understood that this pressure regulating apparatus can operate with any kind of fluid.

The pressure control apparatus comprises a housing block 1, onto which there is mounted a cylindrical casing 2. This cylindrical casing 2 is provided with a closure cap 9. A control chamber 3 is arranged within the cylindrical casing 2.

The outer wall of this control chamber 3 is defined by a spring bellows 4, in which spring bellows 4 there is arranged a cylindrical shell body 5.

The lower end of the spring bellows 4 is airtightly joined at 6 to the housing block 1. The upper end of the spring bellows is airtightly joined at 7 to a ring 8, which ring 8 is in turn airtightly joined to the cylindrical shell body 5. This ring 8 comprises a piston surface 10 facing the control chamber 3. A plug 11 is mounted on the cylindrical shell body 5, which plug 11 extends into a recess 12 of the closure cap 9 and is guided for longitudinal movement therein.

A hollow control rod 13 extends from the lower end of the cylindrical shell body 5 into the housing block 1 and is guided for longitudinal movement therein. This hollow control rod 13 is provided at its bottom section with an annular recess 44.

A helical spring 14 is arranged within the cylindrical shell body 5. The upper end 15 thereof is rigidly connected to the plug 11 and the lower end 16 thereof is connected to a rod 17. This rod 17 penetrates coaxially the hollow control rod 13 and carries at its lower end an adjusting nut 18 screwed on thereto, which adjusting nut 18 bears via a washer 19 against the housing block 1. Accordingly, the spring 14 which acts as a tension spring can be pretensioned or biassed and thereby the force exerted by the spring 14 onto the plug 11 can be adjusted and predetermined. Obviously, the force of the spring 14 counteracts the pressure force acting onto the spring bellows 4 stemming from the pressurized air present within the control chamber 3. A hollow cylindrical clearance is defined between the rod 17 and control rod 13 whereby slight lateral movement of the rod 17 results in a self-centering arrangement therefor. For sake of clarity it shall be noted that the inner space of the cylindrical shell body is in pressure communication with the annular space defined by the outer jacket of the cylindrical shell body 5 and the inner jacket of the spring bellows such that the same pressure prevails within these two spaces.

The housing block 1 is provided with a first connection channel 20 and a second connection channel 21. The first connection channel 20 extends through a coupling nut 22 provided with a coupling member 23 which is to be inserted into an elastomeric tube 24. This elastomeric tube 24 is designed schematically only and extends to a pressure vessel 25 which according to the present embodiment is one tire of a truck having twin tires. The second connection channel 21 extends in the same manner through a coupling nut 26 including a coupling member 27. Furthermore, there is schematically shown again the elastomeric tube 28 and the other pressure vessel, i.e. tire 29.

Figure 4:
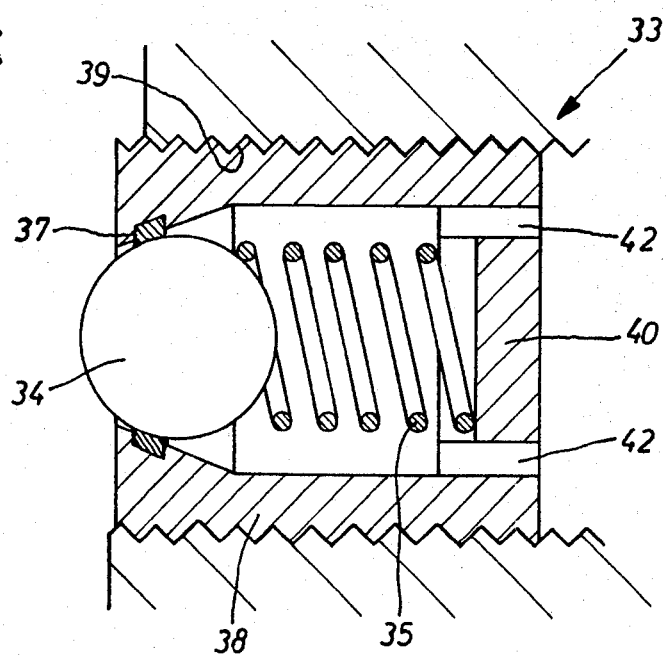
FIG. 4 is a view of a section through a shut-off valve on an enlarged scale.

A nut 30 is screwed onto the lower portion of the housing block 1 and by means of nut 30 the housing block 1 is mounted onto a supporting member 31 (not particularly shown). In the present embodiment the supporting member 31 is the rim of the wheel of a truck. Shut-off valves 32 and 33 are mounted in the connection channels 20 and 21, respectively, of the housing block 1. These shut-off valves 32 and 33 are of identical design and thus the following description is confined to the shut-off valve 33 only, whereby reference is now made to FIG. 4, in which figure the shut-off valve 33 is drawn on an enlarged scale.

The shut-off valve 33 comprises a spherical valve body 34. The valve body 34 is spring biassed by a pressure spring 35 against an elastomeric sealing ring 37.

A carrier 38 is provided with an outer thread 39, with which it is screwed into the connection channel 21. The spring 35 bears against a bottom part 40 of the carrier 38. This bottom part 40 of the carrier 38 is provided with through holes 42 allowing a flow of air therethrough. In the closed position of the shut-off valves 32, 33, which position is shown in FIG. 1, the spherical valve body 34 thereof is located within the annular recess 44 of the control rod 13 without engaging or contacting any area thereof. The valve body 34 rather rests on the elastomeric sealing ring 37.

Figure 2:
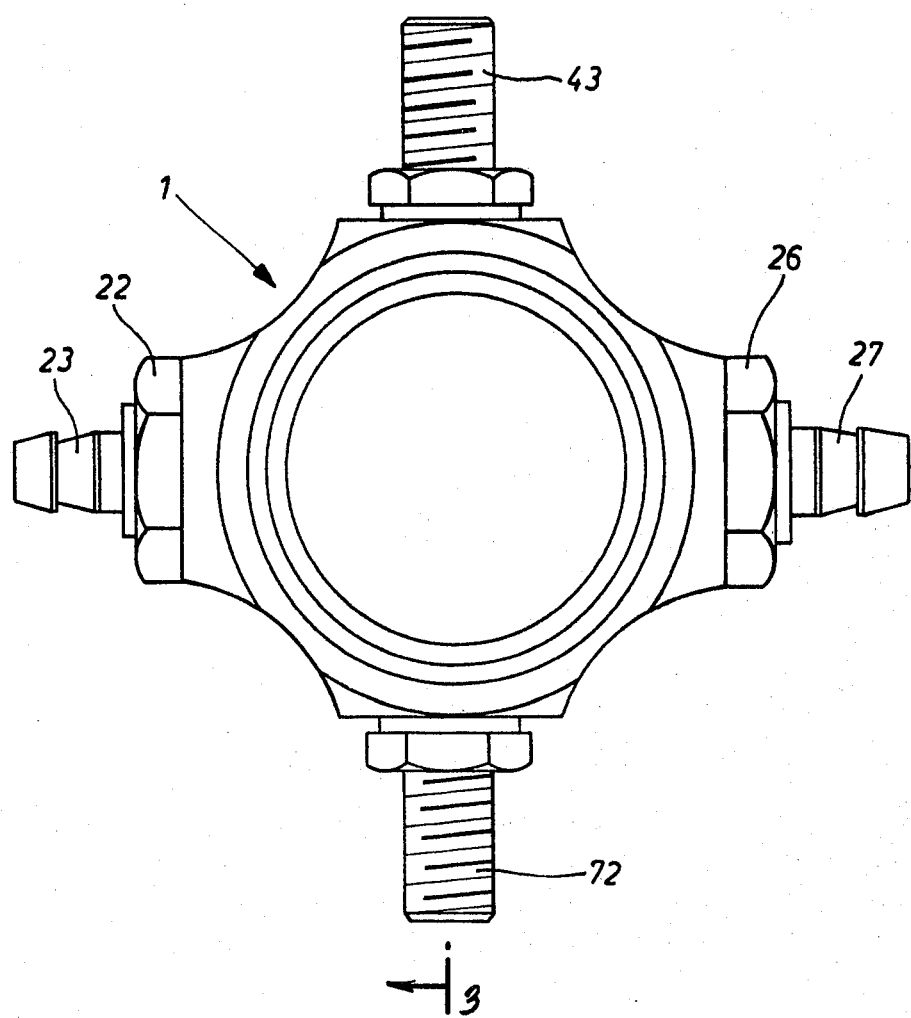
FIG. 2 is a view from above of the pressure control apparatus of FIG. 1.

The housing block 1 comprises further a pressurized air feed plug 43 screwed into the housing block 1. See hereto FIG. 2.

Figure 3:
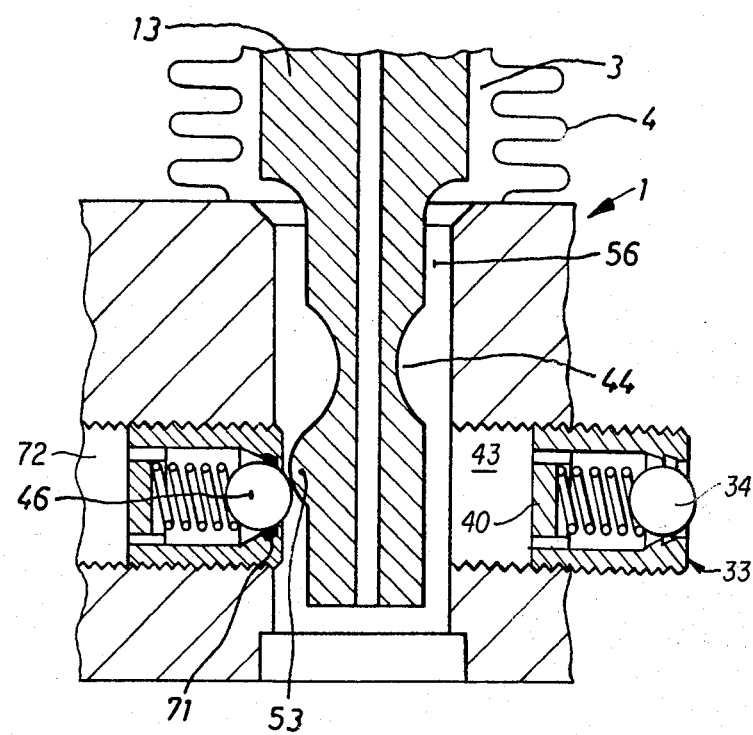
FIG. 3 is a view of a section through a bottom area of the pressure control apparatus of FIG. 3 taken along the line 3—3 of FIG. 2.

An air discharge plug 72 is arranged oppositely to the above mentioned air feed plug 43. A further check valve is arranged within this air discharge plug 72. The design of this check valve is identical to the design of the check valve like shut-off valves described above with reference to FIG. 4. Specifically there is provided a spring biassed spherical valve body 46, see FIG. 3, which in its shut-off position bears against a sealing ring 71. The lowermost end of the control rod 13 is provided with a control lug 53 such as shown in FIG. 3. If now the control rod 13 is moved towards its lower end position, this control lug 53 comes to bear against the spherical valve body 46 such that this valve body 46 is lifted off the sealing ring 71, moving against the spring force acting thereon and accordingly the check valve located within the air discharge plug 72 will be moved to its open position.

If now pressurized air is fed in a known way into the tires, this air is fed through the air feed plug 43. This air feed plug 43 is of a commonly known design used in motor vehicles and comprises the well known check valve 33 illustrated in FIGS. 3 and 4 as being identical to valves 32, 33 of FIG. 11. This air flows through the annular space 56 prevailing between the control rod 13 and the housing block 1 and enters the control chamber 3 (see FIG. 3 and also FIG. 1).

Figure 5:
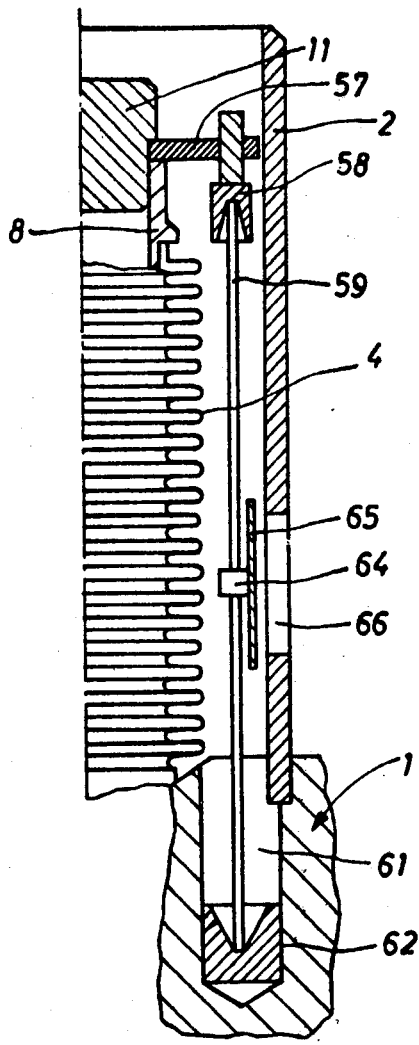
FIG. 5 is a view of a pressure indication arrangement.
Figure 6:
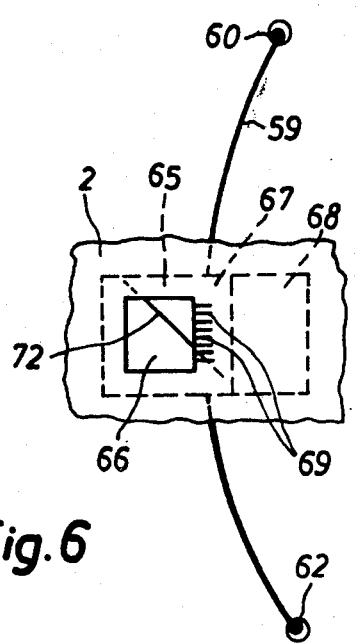
FIG. 6 a schematic front view of the pressure indication arrangement.

Attention is now drawn to FIGS. 5 and 6 depicting the pressure display or indication, respectively, arrangement. A supporting member 57 projects laterally from plug 11 of the control chamber 3. (See also FIG. 1.) This supporting member carries a plug 58, in which an upper end of a slightly biassed bar spring 59 is seated. The opposite, lower end of this bar spring 59 projects into a blind hole 61 formed in the housing block 1, into which a plug 62 is fitted in by a press fit the lower end of the bar spring 59 is seated in the plug 62.

The bar spring 59 is connected by means of a second plug 64 to a display plate 65. According to a further embodiment two linkage members could be mounted in place of the bar spring 59, which two linkage members extend at an obtuse angle relative to each other and are hingedly connected to the plugs 58 and 62, respectively, and hingedly joined at and to plug 64.

A display window 66 is formed in the cylindrical casing 2 at a location corresponding to the location of mentioned display plate 65.

In every position of the control rod 13 the bar spring 59 is slightly bent and biassed laterally such as shown in FIG. 6 in an exaggerated manner.

FIG. 6 is a schematic view in the direction of the arrow A of FIG. 1 of part of the cylindrical casing 2 in which a viewing window 66 is cut out. A part of the display plate 65 can be seen through this window 66. The display plate 65 comprises a green colored field 67 and adjoining a red colored field 68. A black inclined extending line 72 is designed on the green field 65, which line 72 cooperates with markings 69 at an edge area of the window 66 so as to display and allow a reading of the pressure of the air inside of the control chamber 3. If this pressure falls below a predetermined value, the red area 68 of the display plate 65 appears in the window.

The operation of the pressure control apparatus proceeds as follows. It shall be assumed that the pressure in the control chamber 3 and in the two tires 25, 29 is below the operating pressure.

The air feed plug 43 will be coupled to a source of pressurized air such as is available at e.g. a gas station. Accordingly, pressurized air flows through the annular space 56 and into the control chamber 3 such as mentioned earlier. It shall be assumed that the normal operating pressure in the control chamber 3 shall be 3 bar (43.5 psi) and that the control chamber 3 is designed and set accordingly. This value of 3 bar is determined by the mean cross-sectional area of the spring bellows 4 and the adjustable pretension of spring 14. The spring 14 is a tension spring and counteracts the force due to the air pressure. If nut 18 is tightened, the counteracting force of spring 14 will be increased.

If the pressure of the air rises above a value of 2.3 bar (33.35 psi), ring 8 begins to move upwards. Accordingly the cylindrical shell body 5 and specifically the control rod 13 are pulled upwards. Simultaneously, the recess 44 in the control rod 13 retracts from the valve bodies 34 of the valves 32, 33 in FIG. 1. The valve bodies 34 are engaged by the lower section 70 of the control rod 13 and will lift off the valve seats (i.e. sealing rings 37). Accordingly, the pressure connection between the control chamber 3 and the two tires 25, 29 is established. As soon as the feeding of pressurized air to the feeding plug 43 is terminated, its check valve closes in a known manner. However, the valves 32, 33 remain in their open positions because their spherical valve bodies 34 are kept in their open positions by bearing against the lower section 70 of the control rod 13. If now a (minor) pressure differential develops between the two pressure vessels, i.e. the two twin tires 25, 29, such pressure differential will continuously be equalized because the tires 25, 29 communicate pressure-wise with each other.

If now one of the tires 25, 29 begins to lose air to such an amount that its pressure falls below above mentioned value of 3 bar (43.5 psi), the control rod 13, under action of spring 14, will begin to descend. The recess 44 frees the spherical valve bodies 34 of the valves 32, 33 in FIG. 1 such that they move towards their valve seats 37, whereupon both tires 25, 29 will become separated (pressure-wise) from each other as soon as the pre-set closing pressure of the above mentioned e.g. 2.3 bar (33.35 psi) is reached. Consequently the undamaged tire, e.g. 25, suffers no further loss of air. Obviously this closing pressure is chosen such that the undamaged or sound tire features at any time a safe operating pressure.

If now, due to e.g. an increased movement of the walls of the sound tire 25 because it carries now obviously more load because the other tire 29 may be now a "flat" tire, a pressure rise thereof can no longer open any of the valves 32, 33 in FIG. 1. On the contrary, the pressure with which the valve body 34 of valve 32 bears against the sealing ring 37 (valve seat) is increased such that an enhanced pressure-wise separation of the two tires 25, 29 is ensured. The valves 32, 33 of FIG. 1 can be opened exclusively by a renewed feeding of pressurized air through the air feed plug 43.

The described arrangement ensures that upon a sudden pressure loss (e.g. a sudden bursting of a tire) the valves 32,33 of FIG. 1 close suddenly so that the undamaged tire suffers practically no pressure loss.

Because it is important indeed that the valves 32,33 of FIG. 1, which have been closed after a pressure loss, will safely remain closed this embodiment incorporates an arrangement for yet increasing the pressure of the spherical valve bodies 34 bearing against the sealing rings 37.

As can be seen in FIG. 3 the control rod 13 which moves downwards in case of a closing movement lifts by means of the above described control lug 53 the valve body 46 off its seat 71 such that ambient air pressure is established within the control chamber 3. Accordingly, the pressure differential across the valves 32,33 of FIG. 1 increases such that the above mentioned pressure of their valve bodies against their seating is increased, too.

The operation of the display arrangement will be now explained with reference to FIGS. 5 and 6. The slightly biased, thus somewhat laterally bent bar spring 59 is connected at its upper end by means of plug 58 and supporting member 57 to the plug 11 of the control chamber 3 and at its lower end by means of plug 62 to the housing block 1. If now due to a change of pressure inside the control chamber 3 the control rod 13 moves relative to the housing block 1 the bar spring 59 will be increasingly bent such that the movement of the upper end of the bar spring 59 in longitudinal direction of the control apparatus is transformed at the middle section of the bar spring 59 in a radial or lateral movement. This middle section is connected to the display plate 65 as mentioned above and accordingly the display plate 65 shifts laterally.

Due to the diagonally or inclined extending line 72 on the green area of the plate 65, which green area is a general indication of the apparatus being in normal operation, the value of the prevailing pressure can be read with the aid of the markings 69 arranged at the edge of the viewing window 66 (see FIG. 6). If the pressure falls below the nominal operating pressure of e.g. 3 bar (43.5 psi) the red area appears increasingly until the shut-off pressure of e.g. 2.3 bar (33.35 psi) is reached, the indication of insufficient tire pressure.

An embodiment is foreseen which involves a remote indication of certain pressure values of the tires which indication is displayed in the truck drivers cabin such as in the known drivers instrument board. The signal for the electrical transmission and indication is here the position of the control rod which is scanned or sensed. Finally, it is to be noted that in place of the spring bellows 4 a membrane may be provided.

While there are shown and described the present preferred embodiments of the invention, it is to be distinctly understood that the invention is not limited thereto, but may be otherwise variously embodied and practiced within the scope of the following claims.

Accordingly, what is claimed is:

1. A pressure control device comprising
   first and second pressure vessels;
   a housing block having a cylindrical fluid chamber and first and second connection channels communicating with said fluid chamber and with said first and second respective pressure vessels,
   said housing block having third and fourth connection channels communicating with said fluid chamber and with the atmosphere;
   pressure responsive shut-off valve means in each of said connection channels including
   a first valve means having a normally biassed closed position shutting-off flow from said first pressure vessel to said fluid chamber,
   a second valve means having a normally biassed closed position shutting-off flow from said second pressure vessel to said fluid chamber,
   a third valve means having a normally biassed closed position shutting-off flow from the atmosphere to said fluid chamber,
   a fourth valve means having a normally biassed closed position shutting-off flow from said fluid chamber to the atmosphere;
   pressure responsive means carried by said housing block and having a control chamber communicating with said fluid chamber;
   valve control means operatively connected to said pressure responsive means including a cylindrical rod element and a cylindrical rod portion with a hollow bore extending into said fluid chamber,
   first means on said rod portion intermediate its ends adapted to permit the first and second valve means to be disposed in their normally biassed closed positions,
   second means on said rod portion adapted to move the first and second valve means to open positions,
   third means on said rod portion adapted to move said third valve means to an open position,
   said rod element extending coaxially through the bore of said rod portion and being smaller in diameter than the hollow bore to define a cylindrical clearance between the rod element and the bore whereby slight lateral movement of the rod element in the bore results in a self-centering arrangement therefor, said rod element havings its ends protruding out of the bore, a coil spring mounted in tension between one end of said rod element and said pressure responsive means to effect movement of said rod element in response to pressure variations sensed by said pressure responsive means, an operative connection between an opposite end of said rod element and said housing block;

said pressure responsive means having a normal operating pressure condition where the second means on said rod portion retain the first and second valve means in their open positions so that pressure in the first and second pressure vessels is equalized, said pressure responsive means causing the first means on said rod portion to move said first and second valve means to closed positions in response to a drop in pressure in said fluid chamber, said pressure responsive means causing the third means on said rod portion to move said third valve means to an open position whereby said fluid chamber and said control chamber are vented to the atmosphere increasing pressure differential across said first and second valve means to further assure closure thereof, and said fourth valve means defining an inlet for pressurizing the pressure control device from a source of pressurized fluid.

2. The invention of claim 1 wherein said operative connection comprises adjustment means on the opposite end of said rod element to adjust the force exerted on said coil spring.

3. The invention as recited in claim 2 wherein said first means comprises an annular recess on said rod portion precluding opening of said first and second valve means.

4. The invention as recited in claim 3 wherein said means comprises a circumferential part of said rod portion engaging said first and second valve means to open the same.

5. The invention as recited in claim 4 wherein said third means comprises a lug disposed on said rod portion to engage said third valve means to open the same.

6. The invention as recited in claim 5 wherein a cylindrical shell encloses said coil spring and has one end integral with said rod portion, a plug closing an opposite end of said shell.

7. The invention as recited in claim 6 wherein a laterally deflectable connecting link connects said plug to said housing block whereby movement of said plug causes said connecting link to deflect laterally thereto.

8. The invention as recited in claim 7 wherein visual display means is coupled to said connecting link; and indicia on said visual display means to indicate pressure in the control chamber and operational positions of said first, second and third valve means.

* * * * *

UNITED STATES PATENT AND TRADEMARK OFFICE
CERTIFICATE OF CORRECTION

PATENT NO. : 4,410,000

DATED : Oct. 18, 1983

INVENTOR(S) : Beat Mattmann et al

It is certified that error appears in the above-identified patent and that said Letters Patent is hereby corrected as shown below:

On the title page, in the priority data

"April 3, 1980" should read -- April 30, 1980 --.

Signed and Sealed this

Twenty-eighth Day of February 1984

[SEAL]

Attest:

GERALD J. MOSSINGHOFF

*Attesting Officer*      *Commissioner of Patents and Trademarks*